(12) United States Patent
Lutz et al.

(10) Patent No.: US 8,858,752 B2
(45) Date of Patent: Oct. 14, 2014

(54) STRUCTURAL EPOXY RESIN ADHESIVES CONTAINING ELASTOMERIC TOUGHENERS CAPPED WITH KETOXIMES

(71) Applicant: Dow Global Technologies LLC, Midland, MI (US)

(72) Inventors: Andreas Lutz, Galgenen (CH); Daniel Schneider, Wädenswil (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/165,643

(22) Filed: Jan. 28, 2014

(65) Prior Publication Data

US 2014/0138028 A1   May 22, 2014

Related U.S. Application Data

(63) Continuation of application No. 13/503,932, filed as application No. PCT/US2010/052136 on Oct. 11, 2010, now abandoned.

(60) Provisional application No. 61/258,280, filed on Nov. 5, 2009.

(51) Int. Cl.
| | | |
|---|---|---|
| C09J 163/02 | (2006.01) | |
| C09J 163/00 | (2006.01) | |
| C09J 175/00 | (2006.01) | |
| C08G 59/24 | (2006.01) | |
| C08G 71/00 | (2006.01) | |
| C08G 18/48 | (2006.01) | |
| C08G 18/73 | (2006.01) | |
| B29C 65/48 | (2006.01) | |
| C08G 18/12 | (2006.01) | |
| B32B 37/12 | (2006.01) | |
| C08G 18/66 | (2006.01) | |
| B32B 27/38 | (2006.01) | |
| B32B 27/40 | (2006.01) | |
| C08L 75/08 | (2006.01) | |
| C08L 75/04 | (2006.01) | |

(52) U.S. Cl.
CPC ........... *C09J 163/00* (2013.01); *C08G 18/4854* (2013.01); *C08G 18/73* (2013.01); *C08L 75/08* (2013.01); *C08L 75/04* (2013.01); *B29C 65/4835* (2013.01); *C08G 18/12* (2013.01); *B32B 37/12* (2013.01); *C08G 18/6677* (2013.01)
USPC ........ 156/330; 156/331.4; 525/452; 525/453; 525/460; 525/528

(58) Field of Classification Search
None
See application file for complete search history.

(56) References Cited

U.S. PATENT DOCUMENTS

| | | |
|---|---|---|
| 3,686,359 A | 8/1972 | Soldatos et al. |
| 4,734,332 A | 3/1988 | Bagga et al. |
| 5,112,932 A | 5/1992 | Koenig et al. |
| 5,202,390 A | 4/1993 | Mulhaupt et al. |
| 5,232,996 A | 8/1993 | Shah et al. |
| 5,278,257 A | 1/1994 | Mulhaupt et al. |
| 6,015,865 A | 1/2000 | Blank et al. |
| 6,153,709 A | 11/2000 | Xiao et al. |
| 6,660,805 B1 | 12/2003 | Righettini et al. |
| 6,776,869 B1 | 8/2004 | Schenkel |
| 6,809,147 B1 | 10/2004 | Ohno et al. |
| 6,884,854 B2 | 4/2005 | Schoenfeld et al. |
| 6,998,011 B2 | 2/2006 | Schoenfeld et al. |
| 7,615,595 B2 | 11/2009 | Lutz et al. |
| 7,786,214 B2 | 8/2010 | Kramer |
| 7,897,688 B2 | 3/2011 | Gerber et al. |
| 7,919,555 B2 | 4/2011 | Agarwal et al. |
| 8,062,468 B2 | 11/2011 | Finter et al. |
| 8,071,217 B2 | 12/2011 | Kramer et al. |
| 8,076,424 B2 | 12/2011 | Kramer et al. |
| 8,114,519 B2 | 2/2012 | Kramer et al. |
| 8,202,920 B2 | 6/2012 | Kramer et al. |
| 8,222,324 B2 | 7/2012 | Yamaguchi et al. |
| 2003/0187154 A1 | 10/2003 | Schoenfeld et al. |
| 2004/0181013 A1 | 9/2004 | Schenkel |
| 2004/0229990 A1 | 11/2004 | Righettini et al. |
| 2005/0022929 A1 | 2/2005 | Schoenfeld et al. |
| 2005/0070634 A1 | 3/2005 | Lutz et al. |
| 2005/0209401 A1 | 9/2005 | Lutz et al. |
| 2006/0276601 A1 | 12/2006 | Lutz et al. |
| 2007/0105983 A1 | 5/2007 | Kramer et al. |
| 2008/0073029 A1 | 3/2008 | Kramer |
| 2008/0076886 A1 | 3/2008 | Burns et al. |
| 2009/0264558 A1 | 10/2009 | Kramer et al. |

(Continued)

FOREIGN PATENT DOCUMENTS

| | | |
|---|---|---|
| EP | 0303182 A2 | 2/1989 |
| EP | 0343676 A2 | 11/1989 |

(Continued)

OTHER PUBLICATIONS

Machine translation of JP 2001064344 A, provided by the JPO website (no date).*
Kreiling, Stefan, et al., WO2008151946A1, "Adhesive Compositions", Henkel AG & Co., et al.,Dec. 18, 2008, abstract.
Takahiro, Safuku, "Heat-Curable Urethane Composition", Patent Abstracts of Japan, 2001-064344, Mar. 13, 2001, The Yokohama Rubber Co., Ltd.

*Primary Examiner* — Michael J Feely

(57) ABSTRACT

Structural adhesives are prepared from an elastomeric toughener that contains urethane and/or urea groups, and have terminal isocyanate groups that are capped with ketoxime compound. The adhesives have very good storage stability and cure to form cured adhesives that have good lap shear and impact peel strengths, even at −40° C.

13 Claims, No Drawings

(56) References Cited

U.S. PATENT DOCUMENTS

2009/0294057 A1* 12/2009 Liang et al. .................... 156/330
2010/0130655 A1* 5/2010 Agarwal et al. ............... 524/145
2010/0151138 A1 6/2010 Occhiello et al.
2012/0211161 A1* 8/2012 Lutz et al. ..................... 156/330

FOREIGN PATENT DOCUMENTS

| JP | 2001064344 A * | 3/2001 | ............. C08G 18/10 |
| WO | WO 2008016889 A1 * | 2/2008 | ............. C09J 163/00 |
| WO | WO 2009017690 A2 * | 2/2009 | ............. C08L 63/00 |

* cited by examiner

STRUCTURAL EPOXY RESIN ADHESIVES CONTAINING ELASTOMERIC TOUGHENERS CAPPED WITH KETOXIMES

This invention relates to an epoxy-based structural adhesive containing an elastomeric toughener having terminal isocyanate groups, which are blocked with a ketoxime compound.

Epoxy resin based adhesives are used in many applications. In the automotive industry, epoxy resin adhesives are used in many bonding applications, including metal-metal bonding in frame and other structures in automobiles. Some of these adhesives must strongly resist failure during vehicle collision situations. Adhesives of this type are sometimes referred to as "crash durable adhesives", or "CDAs".

In order to obtain the good balance of properties that are needed to meet stringent automotive performance requirements, epoxy adhesives are often formulated with various rubbers and/or "tougheners". These tougheners have blocked functional groups which, under the conditions of the curing reaction, can become de-blocked and react with an epoxy resin. Tougheners of this type are described, for example, in U.S. Pat. No. 5,202,390, U.S. Pat. No. 5,278,257, WO 2005/118734, U.S. Published Patent Application No. 2005/0070634, U.S. Published Patent Application No. 2005/0209401, U.S. Published Patent Application 2006/0276601, EP-A-0 308 664, EP-A 1 728 825, EP-A 1 896 517, EP-A 1 916 269, EP-A 1 916 270, EP-A 1 916 272 and EP-A-1 916 285.

Various types of groups have been suggested for blocking the isocyanate groups of the prepolymer. Most prominent among the blocking groups are amines, as described, for example, in EP-A 1 728 825 and EP-A 1 896 517; phenols, as described, for example, in WO 00/20483 and WO 01/94492; certain acrylates, as described, for example, in WO 03/078163, U.S. Pat. No. 5,232,996, U.S. Pat. No. 6,660,805 and US Published Patent Application 2004/0229990; and epoxides, as are described, for example, in EP 1,431,325, EP 1,498,441, EP 1,648,950 and EP 1,741,734. However, other blocking groups have been suggested. EP-A 1 916 269 describes a toughener containing both epoxy and phenol blocking groups, and mentions that oximes can be used in addition to the epoxy and phenolic types. EP-A 1 916 270 is similar, mentioning that oxime groups can be used as blocking groups for a toughener which also contains other types of capping groups. EP-A 1 916 272 describes adhesives with two separate tougheners, one of which is blocked with an epoxy-functional capping group, and the other of which may be blocked with any of several types of capping groups, one of which may be an oxime.

The capping agent has been found to have very significant effects on the properties of a structural adhesive, both prior to and after it is cured. For one-part adhesives especially, storage stability is a very important attribute. If the adhesive composition is not sufficiently storage-stable, it will prematurely begin to advance in molecular weight. Because of this, the adhesive can thicken or even gel to the point that it cannot be dispensed properly, does not adhere well to the substrate or form a strong cured adhesive layer, or otherwise is no longer usable. Since these adhesives are usually packaged up to several months before they are ultimately used, a lack of storage stability represents a very serious practical problem. In addition, these adhesives may be circulated at 40-50° C. in pumping equipment at the time they are used and, again, good stability is needed to prevent premature gelling in the equipment.

In addition, the selection of the capping group is known to have a significant effect on certain properties of the cured adhesive, among them impact peel strengths at low temperatures. Phenol-type capping agents tend to perform very well in this regard, whereas other types such as epoxide-functional capping groups often provide for relatively poor impact peel strengths. A good structural adhesive will combine both good storage stability and good impact peel values.

This invention is a structural adhesive, comprising:
A) at least one epoxy resin;
B) one or more reactive elastomeric tougheners containing capped isocyanate groups; and
C) one or more epoxy curing agents;
wherein at least 90% of the capped isocyanate groups of the reactive tougheners in the structural adhesive are capped with a ketoxime compound.

Preferably, at least 95% and more preferably at least 98% of the isocyanate groups on the reactive toughener(s) are capped with the ketoxime compound. It is preferred that essentially none (such as 1% or fewer) of those capped isocyanate groups are capped with an epoxy-functional capping group, i.e., a capping group contains epoxide functionality, which would impart epoxide functionality to the capped prepolymer.

The structural adhesive may be formulated into a one-part or a two-part adhesive. In a one-part adhesive, the epoxy curing agent is blended with the rest of the adhesive formulation, and the adhesive exhibits a thermally-activated cure, typically through the use of heat-activated curing agents and/or catalysts. In a two-part adhesive, the epoxy curing agent is packaged separately from the epoxy-functional materials, and the two components are mixed together at the time (or just before) they are to be applied. Two-part adhesives typically do not exhibit a latent or thermally-activated cure, although they may be formulated to do so. The advantages of this invention are most clearly seen in one-part adhesive systems.

The invention is also a method comprising applying the foregoing structural adhesive to the surfaces of two members, and curing the structural adhesive to form an adhesive bond between the two members. At least one and preferably both of the members are metals.

Cured adhesives containing the ketoxime-capped tougheners exhibit surprising good storage stability, while retaining other useful properties such as good lap shear strength and impact peel strength. The cured adhesives tend to fail in a cohesive mode, which is desirable in many crash durable adhesive applications.

The toughener of the invention is elastomeric, contains urethane and/or urea groups and has terminal isocyanate groups, at least 90% of which are capped with a ketoxime compound. Ketoxime compounds can be understood as a condensation product of a ketone with hydroxylamine, and commonly are named as the oxime of the corresponding ketone. Suitable ketoxime compounds can be represented by the general structure I:

wherein each R is an alkyl, cycloalkyl or aryl group, which may in each case be inertly substituted, and further wherein the two R groups may, together with the intervening carbon atom, form an alicyclic ring structure. Preferred R groups include alkyl, such as methyl, ethyl, propyl, butyl, and the like; cyclohexyl or alkyl-substituted cyclohexyl, and phenyl or alkyl-substituted phenyl. The two R groups may be the same or different.

By "inertly substituted" it is meant that any substituents on the R groups do not cause the R groups to be reactive with other components of the structural adhesive formulation under the conditions of manufacture and storage.

Suitable ketoxime compounds include acetoneoxime (which corresponds to structure I with each R being methyl); cyclohexanoneoxime (in which the two R groups and the intervening carbon atom form a cyclohexane ring); acetophenoneoxime (in which one of the R groups is methyl and the other is phenyl); benzophenoneoxime (in which both R groups are phenyl); and 2-butanoneoxime (in which one of the R groups is ethyl and the other is methyl).

Up to 10% of the isocyanate groups may be capped with a capping agent other than the ketoxime, provided that no more than 1% and preferably essentially none of the isocyanate groups contain epoxide moieties. Capping groups other than the ketoxime may be, for example, amines, phenolic compounds, certain hydroxyl-containing acrylate or methacrylate compounds, and the like, as described in U.S. Pat. No. 5,202,390, U.S. Pat. No. 5,278,257, WO 2005/118734, U.S. Published Patent Application No. 2005/0070634, U.S. Published Patent Application No. 2005/0209401, U.S. Published Patent Application 2006/0276601, EP-A-0 308 664, EP-A 1 728 825, EP-A 1 896 517, EP-A 1 916 269, EP-A 1 916 270, EP-A 1 916 272 and EP-A-1 916 285.

The toughener suitably contains, on average, from about 1.5, preferably from about 2.0, to about 8, preferably to about 6, more preferably to about 4, capped isocyanate groups per molecule.

The toughener contains at least one internal segment that provides elastomeric character. It may contain two or more such segments. This segment may be a polyether segment or a segment of a butadiene homopolymer or copolymer. Segments of both types may be present in the toughener. Each elastomeric segment preferably has a molecular weight of from 800 to 5000 daltons, preferably from 1500 to 4000 daltons, measured by gel permeation chromatography (GPC).

The toughener suitably has a number average molecular weight from at least 3000, preferably at least 5000, to about 30,000, preferably to about 20,000 and more preferably to about 15,000, measured by GPC, taking into account only those peaks that represent molecular weights of 1000 or more. The polydispersity (ratio of weight average molecular weight to number average molecular weight) is suitably from about 1 to about 4, preferably from about 1.5 to 2.5.

The toughener may also contain residues of a branching agent, a chain extender, or both.

The elastomeric toughener can be represented by the idealized structure (II)

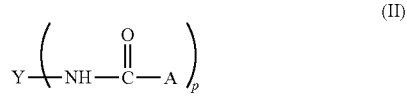

(II)

wherein p represents the average number of capped isocyanate groups per molecule. p is suitably at least 1.5, preferably at least 2, to 8, preferably to 6, more preferably to 4. Each A in structure I represents the residue, after removal of a hydrogen atom, of a capping group. At least 90% of the A groups represent the residue, after removal of a hydrogen atom, from a ketoxime compound as described before. Up to 10% of the A groups, preferably no more than 5% and still more preferably no more than 1% of the A groups may be capping groups other than the ketoxime capping groups. No more than 1% of the A groups contain epoxide moieties, and preferably essentially none of the A groups contain epoxide moieties. All of the A groups may be ketoxime capping groups.

In structure II, Y is the residue of an isocyanate-terminated prepolymer after removal of the terminal isocyanate groups. Y contains at least one elastomeric segment. Each elastomeric segment preferably has a relatively high weight, preferably a weight of at least 800 daltons. The weight of the elastomeric segment may be as high as 5000 daltons, and is preferably from 1500 to 4000 daltons, in each case. This elastomeric segment is preferably linear or at most slightly branched. The elastomeric segment(s) each may be a polyether segment or a segment of a butadiene homopolymer or copolymer, as described before. The Y group may contain one or more segments of each type. The Y group may contain urethane and/or urea groups, and may in addition contain residues (after removal of hydroxyl or amino groups, as the case may be) of one or more crosslinkers or chain extenders. Crosslinkers, for purposes of this invention, are polyol or polyamine compounds having a molecular weight of up to 750, preferably from 50 to 500, and at least three hydroxyl, primary amino and/or secondary amino groups per molecule. Crosslinkers provide branching to the Y group, and are useful to increase the functionality (i.e., number of capped isocyanate groups per molecule) of the toughener. Chain extenders, for purposes of this invention, are polyol or polyamine compounds having a molecular weight of up to 750, preferably from 50 to 500, and two hydroxyl, primary amino and/or secondary amino groups per molecule. Chain extenders help to increase the molecular weight of the toughener without increasing functionality.

The reactive toughener can be prepared by forming an isocyanate-terminated prepolymer, and then capping some of the terminal isocyanate groups with the ketoxime compound (or a mixture of one or more ketoxime compounds with one or more other types of capping groups. The isocyanate-terminated prepolymer can be prepared by reaction of one or more polyol or polyamine compounds with a stoichiometric excess of a polyisocyanate compound, preferably a diisocyanate compound. At least one of the polyol or polyamine compounds imparts elastomeric properties to the toughener, and preferably includes a relatively high weight elastomeric segment, especially a polyether segment or a segment of a butadiene homopolymer or copolymer, as described before.

The polyisocyanate may be an aromatic polyisocyanate, but it is preferably an aliphatic polyisocyanate such as isophorone diisocyanate, 1,6-hexamethylene diisocyanate, hydrogenated toluene diisocyanate, hydrogenated methylene diphenylisocyanate ($H_{12}$MDI), and the like.

In the simplest case, only one polyol or polyamine is used to make the prepolymer. In such a case, the polyol or polyamine preferably contains at least one relatively high weight elastomeric segment as described before, to impart elastomeric properties to the prepolymer. However, it is also possible to use a mixture of polyols or polyamines to make the prepolymer. It is preferred that at least 50%, more preferably at least 80%, and even more preferably at least 90%, by weight of the polyol or polyamine materials used to make the prepolymer include a relatively high weight elastomeric segment as described before.

Other polyols and polyamines that can be used in combination with the elastomeric polyol or polyamine(s) include crosslinkers and chain extenders having a molecular weight of up to about 750. More preferred are aliphatic polyols and polyamines having an equivalent weight of up to 150 and from 2 to 4, especially from 2 to 3, hydroxyl and/or primary or secondary amino groups. Examples of these materials include polyols such as trimethylolpropane, glycerine, trimethylolethane, ethylene glycol, diethylene glycol, propylene glycol, dipropylene glycol, sucrose, sorbitol, pentaerythritol, ethylene diamine, triethanolamine, monoethanolamine, diethanolamine, piperazine, aminoethylpiperazine, compounds having two or more phenolic hydroxyl groups such resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol and o,o'-diallyl-bisphenol A, and the like.

When a mixture of polyols/or polyamines is used to make the prepolymer, the polyisocyanate compound can be reacted all at once with the mixture to produce the prepolymer in a single step. Alternatively, the polyisocyanate may be reacted with each polyol or polyamine compound sequentially, or with various subsets thereof. The latter approach is often useful to produce a prepolymer having a more defined molecular structure.

Thus, for example, a prepolymer can be formed from one or more higher equivalent weight polyols or polyamines having one or more elastomeric segments, as described before, and one or more chain extenders or crosslinkers. In such a case, the prepolymer can be made by reacting all of the polyols and/or polyamines, including chain extenders and/or crosslinkers, at once with the polyisocyanate. Alternatively, a crosslinker or chain extender can be reacted first with the polyisocyanate, followed by reaction with the higher equivalent weight polyol and/or polyamine, or vice versa. In another approach, the higher equivalent weight polyol and/or polyamine, or mixture thereof with a crosslinker, is first reacted with the polyisocyanate, and the resulting product is then reacted with a chain extender or additional crosslinker to advance the molecular weight.

The proportions of starting materials are suitably selected so that the prepolymer has an isocyanate content of from 0.5 to 6% by weight, more preferably from 1 to 5% by weight and even more preferably from 1.5 to 4% by weight. In terms of isocyanate equivalent weight, a preferred range is from 700 to 8400, a more preferred range is from 840 to 4200, and an even more preferred range is from 1050 to 2800.

The elastomeric toughener is then prepared from the prepolymer by reacting the isocyanate groups on the prepolymer with the capping compound or compounds, i.e., at least one ketoxime or a mixture of a ketoxime and one or more other types of capping groups, as described before. The proportions of starting materials in the capping step are selected so that at least one mole of capping compound is provided per equivalent of isocyanate groups on the prepolymer. If two or more capping compounds are used, they can be reacted with the prepolymer simultaneously or sequentially.

The prepolymer-forming reactions are generally performed by mixing the starting materials in the presence of a catalyst for the reaction of isocyanate groups with hydroxyl and/or amino groups, as the case may be. It is not always necessary to catalyze a reaction between the isocyanate groups and an amine. The reaction mixture will typically be heated to an elevated temperature, such as from 60 to 100° C., and the reaction continued until the isocyanate content is reduced to the desired level (approximately 0% for the capping reaction, somewhat higher levels for the prepolymer as described above).

The toughener should constitute at least 5 weight percent of the adhesive composition. Better results are typically seen when the amount of toughener is at least 8 weight percent or at least 10 weight percent. The toughener may constitute up to 45 weight percent thereof, preferably up to 30 weight percent and more preferably up to 25 weight percent. The amount of toughener that is needed to provide good properties, particularly good low temperature properties, in any particular adhesive composition may depend somewhat on the other components of the composition, and may depend somewhat on the molecular weight of the toughener.

The structural adhesive contains at least one epoxy resin. It is preferred that at least a portion of the epoxy resin is not rubber-modified, by which it is meant specifically that the epoxy resin is not chemically bonded to a rubber. A non-rubber-modified epoxy resin may be added to the structural adhesive as a separate component, i.e., as something other than a component of a rubber-modified epoxy resin product or a part of a dispersion of a core-shell rubber, as described below. In some embodiments of the invention, a core-shell rubber product is used, which may be dispersed in some quantity of epoxy resin. Some amount of non-rubber-modified epoxy resin may be brought into the structural adhesive in that manner. In other embodiments, a rubber-modified epoxy resin product used as a component of the structural adhesive may also contain a certain amount of epoxy resin which is not reacted with the rubber (and thus is not rubber-modified). Some non-rubber-modified epoxy resin may be brought into the adhesive in that manner as well.

A wide range of epoxy resins can be used as a non-rubber-modified epoxy resin, including those described at column 2 line 66 to column 4 line 24 of U.S. Pat. No. 4,734,332, incorporated herein by reference. The epoxy resin should have an average of at least 2.0 epoxide groups per molecule.

Suitable epoxy resins include the diglycidyl ethers of polyhydric phenol compounds such as resorcinol, catechol, hydroquinone, bisphenol, bisphenol A, bisphenol AP (1,1-bis(4-hydroxylphenyl)-1-phenyl ethane), bisphenol F, bisphenol K and tetramethylbiphenol; diglycidyl ethers of aliphatic glycols and polyether glycols such as the diglycidyl ethers of $C_{2-24}$ alkylene glycols and poly(ethylene oxide) or poly(propylene oxide)glycols; polyglycidyl ethers of phenol-formaldehyde novolac resins, alkyl substituted phenol-formaldehyde resins (epoxy novolac resins), phenol-hydroxybenzaldehyde resins, cresol-hydroxybenzaldehyde resins, dicyclopentadiene-phenol resins and dicyclopentadiene-substituted phenol resins; and any combination of any two or more thereof.

Suitable epoxy resins include diglycidyl ethers of bisphenol A resins such as are sold by Dow Chemical under the designations D.E.R.® 330, D.E.R.® 331, D.E.R.® 332, D.E.R.® 383, D.E.R. 661 and D.E.R.® 662 resins.

Commercially available diglycidyl ethers of polyglycols that are useful include those sold as D.E.R.® 732 and D.E.R.® 736 by Dow Chemical.

Epoxy novolac resins can be used. Such resins are available commercially as D.E.N.® 354, D.E.N.® 431, D.E.N.® 438 and D.E.N.® 439 from Dow Chemical.

Other suitable non-rubber-modified epoxy resins are cycloaliphatic epoxides. A cycloaliphatic epoxide includes a saturated carbon ring having an epoxy oxygen bonded to two vicinal atoms in the carbon ring, as illustrated by the following structure III:

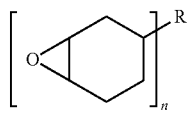

(III)

wherein R is an aliphatic, cycloaliphatic and/or aromatic group and n is a number from 1 to 10, preferably from 2 to 4. When n is 1, the cycloaliphatic epoxide is a monoepoxide. Di- or polyepoxides are formed when n is 2 or more. Mixtures of mono-, di- and/or polyepoxides can be used. Cycloaliphatic epoxy resins as described in U.S. Pat. No. 3,686,359, incorporated herein by reference, may be used in the present invention. Cycloaliphatic epoxy resins of particular interest are (3,4-epoxycyclohexyl-methyl)-3,4-epoxy-cyclohexane carboxylate, bis-(3,4-epoxycyclohexyl) adipate, vinylcyclohexene monoxide and mixtures thereof.

Other suitable epoxy resins include oxazolidone-containing compounds as described in U.S. Pat. No. 5,112,932. In addition, an advanced epoxy-isocyanate copolymer such as those sold commercially as D.E.R. 592 and D.E.R. 6508 (Dow Chemical) can be used.

The non-rubber-modified epoxy resin preferably is a bisphenol-type epoxy resin or mixture thereof with up to 10 percent by weight of another type of epoxy resin. The most preferred epoxy resins are bisphenol-A based epoxy resins and bisphenol-F based epoxy resins. These can have average epoxy equivalent weights of from about 170 to 600 or more, preferably from 225 to 400.

An especially preferred non-rubber-modified epoxy resin is a mixture of a diglycidyl ether of a polyhydric phenol, preferably bisphenol-A or bisphenol-F, having an epoxy equivalent weight of from 170 to 299, especially from 170 to 225, and a second diglycidyl ether of a polyhydric phenol, again preferably bisphenol-A or bisphenol-F, this one having an epoxy equivalent weight of at least 300, preferably from 310 to 600. The proportions of the two resins are preferably such that the mixture of the two resins has an average epoxy equivalent weight of from 225 to 400. The mixture optionally may also contain up to 20%, preferably up to 10%, of one or more other non-rubber-modified epoxy resins.

A non-rubber-modified epoxy resin preferably will constitute at least about 25 weight percent of the structural adhesive, more preferably at least about 30 weight percent, and still more preferably at least about 35 part weight percent. The non-rubber-modified epoxy resin may constitute up to about 60 weight percent of the structural adhesive, more preferably up to about 50 weight percent. These amounts include any non-rubber-modified epoxy resin that may be brought into the composition with other components that contain an epoxy resin such as, for example, a diluent or excess, unreacted reagent.

The structural adhesive also contains a curing agent. For the preferred one-part adhesive, the curing agent is selected together with any catalysts such that the adhesive cures rapidly when heated to a temperature of 80° C. or greater, preferably 140° C. or greater, but cures very slowly if at all at room temperature (~22° C.) and temperatures up to at least 50° C. Suitable curing agents include materials such as boron trichloride/amine and boron trifluoride/amine complexes, dicyandiamide, melamine, diallylmelamine, guanamines such as acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenylsulphones. The use of dicyandiamide, isophthalic acid dihydrazide, adipic acid dihydrazide and/or 4,4'-diaminodiphenylsulphone is particularly preferred.

If the adhesive is formulated as a two-part adhesive, it is not necessary to use a thermally-activated curing agent as described above, although those curing agents could be used if a latent or heat-activated cure is desired for the particular application. A wide variety of liquid polyamine compounds are useful as curing agents when the adhesive is formulated as a two-part adhesive.

The curing agent is used in an amount sufficient to cure the composition. Typically, enough of the curing agent is provided to consume at least 80% of the epoxide groups present in the composition. A large excess over that amount needed to consume all of the epoxide groups is generally not needed. Preferably, the curing agent constitutes at least about 1.5 weight percent of the structural adhesive, more preferably at least about 2.5 weight percent and even more preferably at least 3.0 weight percent.

The curing agent preferably constitutes up to about 15 weight percent of the structural adhesive composition, more preferably up to about 10 weight percent, and most preferably up to about 8 weight percent.

The structural adhesive will in most cases contain a catalyst to promote the cure of the adhesive, i.e., the reaction of epoxy groups with epoxide-reactive groups on the curing agent and other components of the adhesive. Among preferred epoxy catalysts are ureas such as p-chlorophenyl-N,N-dimethylurea (Monuron), 3-phenyl-1,1-dimethylure a (Phenuron), 3,4-dichlorophenyl-N, N-dimethylurea (Diuron), N-(3-chloro-4-methylphenyl)-N',N'-dimethylurea (Chlortoluron), tert-acryl- or alkylene amines like benzyldimethylamine, 2,4,6-tris(dimethylaminomethyl)phenol, piperidine or derivatives thereof, various aliphatic urea compounds such as are described in EP 1 916 272; $C_1$-$C_{12}$ alkylene imidazole or N-arylimidazoles, such as 2-ethyl-2-methylimidazol, or N-butylimidazol and 6-caprolactam. A preferred catalyst is 2,4,6-tris(dimethylaminomethyl)phenol integrated into a poly(p-vinylphenol) matrix (as described in European patent EP 0 197 892). The catalyst may be encapsulated or otherwise be a latent type which becomes active only upon exposure to elevated temperatures.

Preferably, the catalyst is present in an amount of at least about 0.1 weight percent of the structural adhesive, and more preferably at least about 0.5 weight percent. Preferably, the catalyst constitutes up to about 2 weight percent of the structural adhesive, more preferably up to about 1.0 weight percent, and most preferably up to about 0.7 weight percent.

The structural adhesive of the invention may include at least one liquid rubber-modified epoxy resin. A rubber-modified epoxy resin for purposes of this invention is a reaction product of an epoxy resin and at least one liquid rubber that has epoxide-reactive groups, such as amino or preferably carboxyl groups. The resulting adduct has reactive epoxide groups which allow the adduct to react further when the structural adhesive is cured. It is preferred that at least a portion of the liquid rubber has a glass transition temperature ($T_g$) of −40° C. or lower, especially −50° C. or lower. Preferably, each of the rubbers (when more than one is used) has a glass transition temperature of −25° C. or lower. The rubber $T_g$ may be as low as −100° C. or even lower.

The liquid rubber is preferably a homopolymer or copolymer of a conjugated diene, especially a diene/nitrile copolymer. The conjugated diene rubber is preferably butadiene or isoprene, with butadiene being especially preferred. The preferred nitrile monomer is acrylonitrile. Preferred copolymers are butadiene-acrylonitrile copolymers. The rubbers preferably contain, in the aggregate, no more than 30 weight percent polymerized unsaturated nitrile monomer, and preferably no more than about 26 weight percent polymerized nitrile monomer.

The rubber preferably contains from about 1.5, more preferably from about 1.8, to about 2.5, more preferably to about 2.2, of epoxide-reactive terminal groups per molecule, on average. Carboxyl-terminated rubbers are preferred. The molecular weight ($M_n$) of the rubber is suitably from about 2000 to about 6000, more preferably from about 3000 to about 5000.

Suitable carboxyl-functional butadiene and butadiene/acrylonitrile rubbers are commercially available from Noveon under the tradenames Hycar® 2000X162 carboxyl-terminated butadiene homopolymer, Hycar® 1300X31, Hycar® 1300X8, Hycar® 1300X13, Hycar® 1300X9 and Hycar® 1300X18 carboxyl-terminated butadiene/acrylonitrile copolymers. A suitable amine-terminated butadiene/acrylonitrile copolymer is sold under the tradename Hycar® 1300X21.

The rubber is formed into an epoxy-terminated adduct by reaction with an excess of an epoxy resin. Enough of the epoxy resin is provided to react with substantially all of the epoxide-reactive groups on the rubber and to provide free epoxide groups on the resulting adduct without significantly advancing the adduct to form high molecular weight species. A ratio of at least two equivalents of epoxy resin per equivalent of epoxy-reactive groups on the rubber is preferred. More preferably, enough of the epoxy resin is used that the resulting product is a mixture of the adduct and some free epoxy resin; any such free epoxy resin counts towards the non-rubber-modified epoxy resin content of the adhesive. Typically, the rubber and an excess of the polyepoxide are mixed together with a polymerization catalyst and heated to a temperature of about 100 to about 250° C. in order to form the adduct. Suitable catalysts include those described before. Preferred catalysts for forming the rubber-modified epoxy resin include phenyl dimethyl urea and triphenyl phosphine.

A wide variety of epoxy resins can be used to make the rubber-modified epoxy resin, including any of those described above. The epoxy resin may be the same or different from that used to prepare the rubber-modified epoxy resin. Preferred polyepoxides are liquid or solid glycidyl ethers of a bisphenol such as bisphenol A or bisphenol F. Halogenated, particularly brominated, resins can be used to impart flame retardant properties if desired. Liquid epoxy resins (such as DER™ 330 and DER™ 331 resins, which are diglycidyl ethers of bisphenol A available from The Dow Chemical Company) are especially preferred for ease of handling.

The rubber-modified epoxy resin(s), if present at all, may constitute about 1 weight percent of the structural adhesive or more, preferably at least about 2 weight percent. The rubber-modified epoxy resin may constitute up to about 25 weight percent of the structural adhesive, more preferably up to about 20 weight percent, and even more preferably up to about 15 weight percent.

The structural adhesive of the invention may contain one or more core-shell rubbers. The core-shell rubber is a particulate material having a rubbery core. The rubbery core preferably has a $T_g$ of less than −20° C., more preferably less than −50° C. and even more preferably less than −70° C. The $T_g$ of the rubbery core may be well below −100° C. The core-shell rubber also has at least one shell portion that preferably has a $T_g$ of at least 50° C. By "core", it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material is preferably grafted onto the core or is crosslinked or both. The rubbery core may constitute from 50 to 95%, especially from 60 to 90%, of the weight of the core-shell rubber particle.

The core of the core-shell rubber may be a polymer or copolymer of a conjugated diene such as butadiene, or a lower alkyl acrylate such as n-butyl-, ethyl-, isobutyl- or 2-ethylhexylacrylate. The core polymer may in addition contain up to 20% by weight of other copolymerized monounsaturated monomers such as styrene, vinyl acetate, vinyl chloride, methyl methacrylate, and the like. The core polymer is optionally crosslinked. The core polymer optionally contains up to 5% of a copolymerized graft-linking monomer having two or more sites of unsaturation of unequal reactivity, such as diallyl maleate, monoallyl fumarate, allyl methacrylate, and the like, at least one of the reactive sites being non-conjugated.

The core polymer may also be a silicone rubber. These materials often have glass transition temperatures below −100° C. Core-shell rubbers having a silicone rubber core include those commercially available from Wacker Chemie, Munich, Germany, under the trade name Genioperl™

The shell polymer, which is optionally chemically grafted or crosslinked to the rubber core, is preferably polymerized from at least one lower alkyl methacrylate such as methyl-, ethyl- or t-butyl methacrylate. Homopolymers of such methacrylate monomers can be used. Further, up to 40% by weight of the shell polymer can be formed from other monovinylidene monomers such as styrene, vinyl acetate, vinyl chloride, methyl acrylate, ethyl acrylate, butyl acrylate, and the like. The molecular weight of the grafted shell polymer is generally between 20,000 and 500,000.

A preferred type of core-shell rubber has reactive groups in the shell polymer which can react with an epoxy resin or an epoxy resin hardener. Glycidyl groups such as are provided by monomers such as glycidyl methacrylate are suitable.

A particularly preferred type of core-shell rubber is of the type described in EP 1 632 533 A1. Core-shell rubber particles as described in EP 1 632 533 A1 include a crosslinked rubber core, in most cases being a crosslinked copolymer of butadiene, and a shell which is preferably a copolymer of styrene, methyl methacrylate, glycidyl methacrylate and optionally acrylonitrile. The core-shell rubber is preferably dispersed in a polymer or an epoxy resin, also as described in EP 1 632 533 A1.

Preferred core-shell rubbers include those sold by Kaneka Corporation under the designation Kaneka Kane Ace, including Kaneka Kane Ace MX 156 and Kaneka Kane Ace MX 120 core-shell rubber dispersions. The products contain the core-shell rubber particles pre-dispersed in an epoxy resin, at a concentration of approximately 25%. The epoxy resin contained in those products will form all or part of the non-rubber-modified epoxy resin component of the structural adhesive of the invention.

The core-shell rubber particles can constitute from 0 to 15 weight percent of the structural adhesive.

The total rubber content of the structural adhesive of the invention can range from as little as 0 weight percent to as high as 30 weight percent. A preferred rubber content for a crash durable adhesive is from 1 weight percent to as much as 20 weight percent, preferably from 2 to 15 weight percent and more preferably from 4 to 15 weight percent.

Total rubber content is calculated for purposes of this invention by determining the weight of core-shell rubber (if any), plus the weight contributed by the liquid rubber portion of any rubber-modified epoxy resin as may be used. No portion of the elastomeric toughener is considered in calculating total rubber content. In each case, the weight of unreacted (non-rubber-modified) epoxy resins and/or other carriers, diluents, dispersants or other ingredients that may be contained in a core-shell rubber product or rubber-modified epoxy resin is not included. The weight of the shell portion of the core-shell rubber is counted as part of the total rubber content for purposes of this invention.

The structural adhesive of the invention may contain various other optional components.

The speed and selectivity of the cure can be enhanced and adjusted by incorporating a monomeric or oligomeric, addition polymerizable, ethylenically unsaturated material into the structural adhesive. This material should have a molecular weight of less than about 1500. This material may be, for example, an acrylate or methacrylate compound, an unsaturated polyester, a vinyl ester resin, or an epoxy adduct of an unsaturated polyester resin. A free radical initiator can be included in the structural adhesive as well, in order to provide a source of free radicals to polymerize this material. The inclusion of an ethylenically unsaturated material of this type provides the possibility of effecting a partial cure of the structural adhesive through selective polymerization of the ethylenic unsaturation.

At least one filler, rheology modifier and/or pigment is preferably present in the structural adhesive. These can perform several functions, such as (1) modifying the rheology of the adhesive in a desirable way, (2) reducing overall cost per unit weight, (3) absorbing moisture or oils from the adhesive or from a substrate to which it is applied, and/or (4) promoting cohesive, rather than adhesive, failure. Examples of these materials include calcium carbonate, calcium oxide, talc, carbon black, textile fibers, glass particles or fibers, aramid pulp, boron fibers, carbon fibers, mineral silicates, mica, powdered quartz, hydrated aluminum oxide, bentonite, wollastonite, kaolin, fumed silica, silica aerogel, polyurea compounds, polyamide compounds or metal powders such as aluminum powder or iron powder. Another filler of particular interest is a microballoon having an average particle size of up to 200 microns and density of up to 0.2 g/cc. The particle size is preferably about 25 to 150 microns and the density is preferably from about 0.05 to about 0.15 g/cc. Heat expandable microballoons which are suitable for reducing density include those commercially available from Dualite Corporation under the trade designation Dualite™, and those sold by Akzo Nobel under the trade designation Expancel™.

Fillers, pigment and rheology modifiers are preferably are used in an aggregate amount of about 2 parts per hundred parts of adhesive composition or greater, more preferably about 5 parts per hundred parts of adhesive composition or greater. They preferably are present in an amount of up to about 25 weight percent of the structural adhesive, more preferably up to about 20 weight percent, and most preferably up to about 15 weight percent.

The structural adhesive can further contain other additives such as dimerized fatty acids, diluents, plasticizers, extenders, pigments and dyes, fire-retarding agents, thixotropic agents, expanding agents, flow control agents, adhesion promoters and antioxidants. Suitable expanding agents include both physical and chemical type agents. The adhesive may also contain a thermoplastic powder such as polyvinylbutyral or a polyester polyol, as described in WO 2005/118734.

Various preferred adhesives of the invention are as follows:

A. An adhesive that includes at least one diglycidyl ether of a polyhydric phenol; a liquid rubber-modified epoxy resin, a core-shell rubber or both a liquid rubber-modified epoxy resin and a core-shell rubber; and from about 8 to 30 weight percent of the toughener as described herein.

B. An adhesive as in A, wherein the diglycidyl ether of a polyhydric phenol is a diglycidyl ether of bisphenol A or bisphenol F, and has an equivalent weight of from 170 to 299.

C. An adhesive as in A or B, which contains a mixture of a diglycidyl ether of a polyhydric phenol, preferably bisphenol-A or bisphenol-F, having an epoxy equivalent weight of from 170 to 299, especially from 170 to 225, and a second diglycidyl ether of a polyhydric phenol, again preferably bisphenol-A or bisphenol-F, this one having an epoxy equivalent weight of at least 300, preferably from 310 to 600. The proportions of the two resins are preferably such that the mixture of the two resins has an average epoxy equivalent weight of from 225 to 400.

D. An adhesive as in A, B, or C, wherein the toughener contains one or more polyether segments of from 800 to 5000 daltons each.

E. An adhesive as in A, B, C or D, which is a one-part adhesive that contains a curing agent and a catalyst, and which cures rapidly at a temperature of 140° C. or higher but slowly if at all at a temperature of 80° C. or lower.

The adhesive composition can be applied by any convenient technique. It can be applied cold or be applied warm if desired. It can be applied by extruding it from a robot into bead form on the substrate, it can be applied using mechanical application methods such as a caulking gun, or any other manual application means, and it can also be applied using jet spraying methods such as a streaming method or a swirl technique. The swirl technique is applied using an apparatus well known to one skilled in the art such as pumps, control systems, dosing gun assemblies, remote dosing devices and application guns. Preferably, the adhesive is applied to the substrate using a jet spraying or streaming process. Generally, the adhesive is applied to one or both substrates. The substrates are contacted such that the adhesive is located between the substrates to be bonded together.

After application, the structural adhesive is cured by heating to a temperature at which the curing agent initiates cure of the epoxy resin composition. Generally, this temperature is about 80° C. or above, preferably about 140° C. or above for a one-part adhesive. Preferably, the temperature is about 220° C. or less, and more preferably about 180° C. or less for a one-part adhesive. Two-part adhesives are often cured at much lower temperatures.

The adhesive of the invention can be used to bond a variety of substrates together including wood, metal, coated metal, aluminum, a variety of plastic and filled plastic substrates, fiberglass and the like. In one preferred embodiment, the adhesive is used to bond parts of automobiles together or to bond automotive parts onto automobiles. Such parts can be steel, coated steel, galvanized steel, aluminum, coated aluminum, plastic and filled plastic substrates.

An application of particular interest is bonding of automotive frame components to each other or to other components. The frame components are often metals such as cold rolled steel, galvanized metals, or aluminum. The components that are to be bonded to the frame components can also be metals as just described, or can be other metals, plastics, composite materials, and the like.

Adhesion to brittle metals such as galvaneal is of particular interest in the automotive industry. Galvaneal tends to have a zinc-iron surface that is somewhat rich in iron content and is brittle for that reason. A particular advantage of this invention is that the cured adhesive bonds well to brittle metals such as galvaneal. Another application of particular interest is the bonding of aerospace components, particularly exterior metal components or other metal components that are exposed to ambient atmospheric conditions during flight.

Assembled automotive frame members are usually coated with a coating material that requires a bake cure. The coating is typically baked at temperatures that may range from 140° C. to over 200° C. In such cases, it is often convenient to apply the structural adhesive to the frame components, then apply the coating, and cure the adhesive at the same time the coating is baked and cured.

The adhesive composition once cured preferably has a Young's modulus, at 23° C., of about 1000 MPa as measured according to DIN EN ISO 527-1. Preferably the Young's modulus is about 1200 MPa or greater, more preferably at least 1500 MPa. Preferably, the cured adhesive demonstrates a tensile strength at 23° C. of about 20 MPa or greater, more preferably about 25 MPa or greater, and most preferably about 35 MPa or greater. Preferably, the lap shear strength of a 1.5 mm thick cured adhesive layer on cold rolled steel (CRS) and galvaneal at 23° C. is about 15 MPa or greater, more preferably about 20 MPa or greater, and most preferably about 25 MPa or greater measured according to DIN EN 1465.

The cured adhesive of the invention demonstrates excellent adhesive properties (such as lap shear strength and impact peel strength) over a range of temperatures down to −40° C. or lower.

The following examples are provided to illustrate the invention but are not intended to limit the scope thereof. All parts and percentages are by weight unless otherwise indicated.

Toughener Examples 1-5 and Comparative Tougheners A and B

A prepolymer is prepared by mixing, under nitrogen, 80.8 parts of a 2000 molecular weight polytetrahydrofuran, 0.6 part of trimethylolpropane and 0.1 part of a tin catalyst and heating at 85° C. until a homogeneous mixture is obtained. 13.5 parts 1,6-hexamethylene diisocyanate are added and the mixture is allowed to react under nitrogen at 85° C. for one hour. 0.01 part of an antioxidant is added. The resulting prepolymer has an isocyanate content of 3.0%.

The prepolymer is then mixed with 5.0 parts of acetoneoxime under nitrogen. The mixture is allowed to stir at 85° C. for 60 minutes to allow the capping reaction to complete (i.e., the isocyanate content is reduced to zero). The resulting toughener (Example 1) is degassed under vacuum. It has a number average molecular weight of 5200, a weight average molecular weight of 12,900 (both as measured by GPC, taking into account only those peaks that represent molecular weights of 1000 or more) and a polydispersity index of 2.4.

Toughener Example 2 is made in the same general manner, using 78.8 parts of the polytetrahydrofuran, 0.5 part of the trimethylolpropane and 13.2 parts of the 1,6-hexamethylene diisocyanate to produce the prepolymer. Instead of acetoneoxime, 7.5 parts of cyclohexaneoneoxime is used to cap the prepolymer. The resulting Toughener Example 2 has a number average molecular weight of 4900, a weight average molecular weight of 12,600 (both as measured by GPC as before) and a polydispersity index of 2.5.

Toughener Example 3 is made in the same general manner as Example 1, using 77.6 parts of the polytetrahydrofuran, 0.5 part of the trimethylolpropane and 13.0 parts of the 1,6-hexamethylene diisocyanate to produce the prepolymer. Instead of acetoneoxime, 8.9 parts of acetophenoneoxime is used to cap the prepolymer. Toughener Example 3 has a number average molecular weight of 5000, a weight average molecular weight of 12,200 (both as measured by GPC as before) and a polydispersity index of 2.4.

Toughener Example 4 is made in the same general manner as Example 1, using 74.6 parts of the polytetrahydrofuran, 0.5 part of the trimethylolpropane and 12.5 parts of the 1,6-hexamethylene diisocyanate to produce the prepolymer. Instead of acetoneoxime, 12.4 parts of benzophenoneoxime is used to cap the prepolymer. Toughener Example 4 has a number average molecular weight of 4700, a weight average molecular weight of 10,100 (both as measured by GPC as before) and a polydispersity index of 2.2.

Toughener Example 5 is made in the same general manner as Example 1, using 80.1 parts of the polytetrahydrofuran, 0.6 part of the trimethylolpropane and 13.4 parts of the 1,6-hexamethylene diisocyanate to produce the prepolymer. Instead of acetoneoxime, 5.9 parts of 2-butanoneoxime is used to cap the prepolymer. Toughener Example 5 has a number average molecular weight of 4700, a weight average molecular weight of 11,000 (both as measured by GPC as before) and a polydispersity index of 2.3.

Comparative Toughener A is made by mixing, under nitrogen at 85° C., 77.6 parts of a 2000 molecular weight polytetrahydrofuran and 0.5 part of trimethylolpropane until homogeneous, then adding 13.0 parts of 1,6-hexamethylenediisocyanate and 0.06 part of a tin catalyst and heating at 85° C. for 45 minutes to produce a 2.6% NCO prepolymer. 8.8 parts of 2-allylphenol is then added, and the mixture is stirred at 85° C. for 20 minutes to allow the capping reaction to complete. Comparative Toughener A is degassed under vacuum.

Comparative Toughener B is made by mixing, under nitrogen, 64.9 parts of a 2000 molecular weight polytetrahydrofuran and 0.3 part of trimethylolpropane until homogeneous, then adding 10.0 parts of 1,6-hexamethylenediisocyanate and 0.05 part of a tin catalyst and heating at 85° C. for 45 minutes to produce a 2% NCO prepolymer. 24.8 parts of o,o'-diallylbisphenol A is then added, and the mixture is stirred at 85° C. for 20 minutes to allow the capping reaction to complete. Comparative Toughener B is degassed under vacuum. This toughener is similar to that described in U.S. Pat. No. 5,278,257 Example 13.

Comparative Toughener C is made by mixing 19.2 parts of a 2000 molecular weight polytetrahydrofuran, 13.2 parts of a polybutadiene diol (PolyBD™ R-45 HT from Sartomer) and 15.6 parts of a 2000 molecular weight polypropylene diol for 30 minutes under vacuum at 105° C., reducing the temperature to 90° C. and adding 10.4 parts of isophorone diisocyanate and 0.1 parts of a tin catalyst. The mixture is allowed to react for 60 minutes to produce a 3.5% NCO prepolymer, which is then capped by adding 41.6 parts of the di- and tri-glycidyl ethers of trimethylolpropane and heating at 90° C. for 60 minutes.

Comparative Toughener D is made by mixing, under nitrogen, 66.6 parts of a 2000 molecular weight polytetrahydrofuran, 20.7 parts of bisphenol-A and 0.3 part of trimethylolpropane are mixed at 120° C. until homogeneous, and cooled to 85° C. 12.3 parts of 1,6-hexamethylenediisocyanate and 0.1 part of a tin catalyst are added, and the resulting mixture is heated at 85° C. for 45 minutes to produce a prepolymer terminated in bisphenol-A-capped isocyanate groups.

Storage stability is evaluated by storing duplicate samples of each of Toughener Examples 1-5 and Comparative Tougheners A and B in sealed containers under nitrogen for four months, at various temperatures from about 25° C. to 90° C. Weight average molecular weight is determined for each sample at the end of the aging period and compared with that of the same material at the beginning of the storage period.

The extent to which build-up of molecular weight is seen is indicative of the storage stability of the material.

Comparative Tougheners A and B show good storage stability on this test at temperatures up to 40° C., but shows a significant build-up in molecular weight when stored at temperatures above 40° C.

Toughener Examples 1, 2 and 5 are storage stable on this test at temperatures up to 80° C. Toughener Examples 3 and 4 are storage stable on this test at temperatures up to 55° C. All of the Examples of the invention are significantly more storage stable than Comparative Tougheners A and B.

One-part, heat activated adhesive formulations are prepared from each of Toughener Examples 1-5, Comparative Tougheners C, Comparative Toughener D, and a 50/50 by weight of Toughener Example 2 and Comparative Toughener C, using the following formulation:

TABLE 1

| Component | Parts By Weight |
| --- | --- |
| Diglycidyl ether of bisphenol A | 25.1 |
| Epoxy-terminated rubber[1] | 37.7 |
| Toughener | 19.0 |
| Dicyandiamide | 3.8 |
| Accelerator[2] | 0.9 |
| Fumed Silica | 8.3 |
| Fillers/Colorants | 0.4 |
| Versatic acid monoepoxy ester[3] | 1.2 |
| Glycidyl silyl ether[4] | 0.7 |
| Polyvinyl butyral[5] | 2.9 |

[1]A reaction product of approximately 60 parts a liquid diglycidyl ether of bisphenol F with 40 parts of Hycar 1300X13 rubber (a carboxy-terminated butadiene-acrylonitrile copolymer having a $T_g$ lower than −40° C., available from Noveon) to which is added from 2 to 5 parts of bisphenol A.
[2]Tris (2,4,6-dimethylaminomethyl)phenol in a poly(vinylphenol) matrix.
[3]Cardura ™ E10, available from Christ Chemie.
[4]Dynasilane A-187 from General Electric Silicones.
[5]Mowital B60 HH from Kuraray.

Adhesive Examples A1-A5 contain Toughener Examples 1-5, respectively.

Comparative Adhesive A contains Comparative Toughener D, and Comparative Adhesive B contains Comparative Toughener C. In Comparative Adhesive C, the toughener consists of 9.5 parts of Toughener 2 and 9.5 parts of Comparative Toughener C.

Impact peel testing is performed in accordance with ISO 11343 wedge impact method. Testing is performed at an operating speed of 2 m/sec. Impact peel testing is performed at 23° C. and −40° C., and strength in N/mm is measured.

Test coupons for the impact peel testing are 90 mm×20 mm with a bonded area of 30×20 mm. The samples are prepared by wiping them with acetone. A 0.15 mm×10 mm wide Teflon tape is applied to the coupons to define the bond area. The structural adhesive is then applied to the bond area of latter coupon and squeezed onto the first coupon to prepare each test specimen. The adhesive layer is 0.2 mm thick. Duplicate samples are cured for 30 minutes at 180° C. The substrates are 1 mm degreased cold rolled steel (CRS) 14O3 steel coupons.

Duplicate test coupons are prepared and are evaluated for lap shear strength in accordance with DIN EN 1465, using 1.5 mm degreased CRS 14O3 steel coupons as the substrate. Testing is performed at a test speed of 10 mm/minute. Testing is performed at 23° C. Test samples are prepared using each adhesive. The bonded area in each case is 25×10 mm. The adhesive layer is 0.2 mm thick. Duplicate test specimens are cured at for 30 minutes at 180° C.

Results of the lap shear strength and impact peel strength testing are as reported in Table 2. In this and the following examples, failure mode is described as "AF" ("adhesive failure") or as "CF" (cohesive failure). Samples which exhibit a mixed failure mode are described by the percentage of the cohesive failure mode that is seen.

TABLE 2

| Ex. or Comp. Sample No. | Toughener | Lap Shear Str. (MPa)/ failure mode | Elongation at Break, mm | Impact Peel Str., RT (N/mm)/ failure mode | Impact Peel Str., −40° C. (N/mm)/ failure mode |
| --- | --- | --- | --- | --- | --- |
| 1 | 1 | 28/CF | 4 | 44.0/CF | 35.8/CF |
| 2 | 2 | 29/CF | 4 | 41.9/CF | 34.7/90% CF |
| 3 | 3 | 30/CF | 4 | 43.7/CF | 36.0/CF |
| 4 | 4 | 27/CF | 3 | 39.1/CF | 20.4/50% CF |
| 5 | 5 | 28/CF | 4 | 41.6/CF | 36.6/CF |
| A* | D | 31/30% CF | 4 | 43.6/CF | 36.9/CF |
| B* | C | 25/AF | 3 | 7.1/CF | 0.3/CF |
| C* | C/2 | 30/CF | 5 | 31.9/CF | 1.7/CF |

*Not an example of the invention. CF is cohesive failure, AF is adhesive failure.

The data in Table 2 indicates that the structural adhesives of the invention have lap shear and impact peel strengths similar to those of the best of the comparative samples (A), and exhibit significantly better impact peel strength values, particularly at −40° C., than either of Comparative Samples B and C.

One-part, heat activated Adhesive Example 6, Comparative Adhesive D and Comparative Adhesive E are prepared from Toughener Example 1 and Comparative Tougheners B and A, respectively, using the following formulation:

TABLE 3

| Component | Parts By Weight |
| --- | --- |
| Diglycidyl ethers of bisphenol A | 34.5 |
| Solid epoxy resin[1] | 20.2 |
| Epoxy-terminated rubber[2] | 13.2 |
| Toughener | 14.0 |
| Dicyandiamide | 4.3 |
| Accelerator[3] | 1.0 |
| Fumed Silica | 5.1 |
| Fillers/Colorants | 5.8 |
| Versatic acid monoepoxy ester[4] | 1.2 |
| Glycidyl silyl ether[5] | 0.7 |

[1]A solid bisphenol A-based epoxy resin, sold by Dow Chemical as DER ™ 671.
[2]Reaction product of 39% of a liquid diglycidyl ether of bisphenol A, 38% of Hycar 1300X13 rubber (a carboxy-terminated butadiene-acrylonitrile copolymer having a $T_g$ lower than −40° C., available from Noveon) and from 23% of a liquid cashew nut oil.
[3]Tris (2,4,6-dimethylaminomethyl)phenol in a poly(vinylphenol) matrix.
[4]Cardura ™ E10, available from Christ Chemie.
[5]Dynasilane A-187 from General Electric Silicones.

The storage stability of Adhesive Example 6, Comparative Adhesive D and Comparative Adhesive E are all evaluated by aging duplicate samples of each at 23° C., 40° C. and 50° C. Viscosity is measured at 4-week intervals, using a Bohlin CS-50 rheometer and plate/cone system CP 4°/20 mm, at a temperature of 45° C. and shear rates of 1 s$^{-1}$ and 10 s$^{-1}$. For further comparison, a commercially available adhesive (Sika Power 492, Comparative Adhesive F) is evaluated in the same way. Results are as indicated in Tables 4-9. "ND" in Tables 4-9 indicates that no measurement was made.

TABLE 4

Storage Stability at 23° C., 1 s⁻¹ shear rate

|  | Adhesive Example 6 | Comparative Adhesive D | Comparative Adhesive E | Comparative Adhesive F |
|---|---|---|---|---|
| Toughener | 1 | B | A | Commercial Product |
| Aging Time, weeks, at 23° C. | Viscosity, Pa · s, at 45° C. | | | |
| Initial Value | 303 | 399 | 277 | 1052 |
| 4 weeks | 259 | 347 | 279 | 1002 |
| 8 weeks | 281 | 393 | 276 | 1047 |
| 12 weeks | 253 | 359 | ND | 1142 |
| 16 weeks | 242 | 371 | 297 | ND |
| 20 weeks | 226 | 425 | 283 | 1237 |

TABLE 5

Storage Stability at 23° C., 10 s⁻¹ shear rate

|  | Adhesive Example 6 | Comparative Adhesive D | Comparative Adhesive E | Comparative Adhesive F |
|---|---|---|---|---|
| Toughener | 1 | B | A | Commercial Product |
| Aging Time, weeks, at 23° C. | Viscosity, Pa · s, at 45° C. | | | |
| Initial Value | 88 | 133 | 81 | 275 |
| 4 weeks | 90 | 135 | 91 | 260 |
| 8 weeks | 97 | 158 | 96 | 276 |
| 12 weeks | 94 | 157 | ND | 295 |
| 16 weeks | 91 | 166 | 115 | ND |
| 20 weeks | 87 | 211 | 108 | 324 |

At 23° C., Adhesive Example 6 shows no viscosity increase upon aging for at least 20 weeks. Each of the Comparative Adhesives, however, exhibits a significant viscosity increase over the course of the 20-week aging period. This increase is seen more clearly at the 10 s⁻¹ shear rate, in Table 5.

TABLE 6

Storage Stability at 40° C., 1 s⁻¹ shear rate

|  | Adhesive Example 6 | Comparative Adhesive D | Comparative Adhesive E | Comparative Adhesive F |
|---|---|---|---|---|
| Toughener | 1 | B | A | Commercial Product |
| Aging Time, weeks, at 40° C. | Viscosity, Pa · s, at 45° C. | | | |
| Initial Value | 303 | 399 | 277 | 1052 |
| 4 weeks | 274 | 417 | 331 | 1194 |
| 8 weeks | 324 | 480 | 379 | 1284 |
| 12 weeks | 296 | 540 | ND | 1531 |
| 16 weeks | 292 | 747 | 640 | ND |
| 20 weeks | 323 | 1129 | 794 | Gelled |

TABLE 7

Storage Stability at 40° C., 10 s⁻¹ shear rate

|  | Adhesive Example 6 | Comparative Adhesive D | Comparative Adhesive E | Comparative Adhesive F |
|---|---|---|---|---|
| Toughener | 1 | B | A | Commercial Product |
| Aging Time, weeks, at 40° C. | Viscosity, Pa · s, at 45° C. | | | |
| Initial Value | 88 | 133 | 81 | 275 |
| 4 weeks | 100 | 188 | 122 | 307 |
| 8 weeks | 122 | 241 | 153 | 281 |
| 12 weeks | 123 | 300 | ND | 399 |

TABLE 7-continued

Storage Stability at 40° C., 10 s⁻¹ shear rate

|  | Adhesive Example 6 | Comparative Adhesive D | Comparative Adhesive E | Comparative Adhesive F |
|---|---|---|---|---|
| 16 weeks | 137 | 455 | 372 | ND |
| 20 weeks | 168 | 727 | 467 | Gelled |

TABLE 8

Storage Stability at 50° C., 1 s⁻¹ shear rate

|  | Adhesive Example 6 | Comparative Adhesive D | Comparative Adhesive E | Comparative Adhesive F |
|---|---|---|---|---|
| Toughener | 1 | B | A | Commercial Product |
| Aging Time, weeks, at 50° C. | Viscosity, Pa · s, at 45° C. | | | |
| Initial Value | 303 | 399 | 277 | 1052 |
| 4 weeks | 297 | 513 | 414 | 1333 |
| 8 weeks | 356 | 1291 | 790 | Gelled |
| 12 weeks | 749 | Gelled | Gelled | Gelled |
| 16 weeks | Gelled | Gelled | Gelled | Gelled |
| 20 weeks | Gelled | Gelled | Gelled | Gelled |

TABLE 9

Storage Stability at 50° C., 10 s⁻¹ shear rate

|  | Adhesive Example 6 | Comparative Adhesive D | Comparative Adhesive E | Comparative Adhesive F |
|---|---|---|---|---|
| Toughener | 1 | B | A | Commercial Product |
| Aging Time, weeks, at 50° C. | Viscosity, Pa · s, at 45° C. | | | |
| Initial Value | 88 | 133 | 81 | 275 |
| 4 weeks | 122 | 268 | 178 | 334 |
| 8 weeks | 184 | 798 | 464 | Gelled |
| 12 weeks | 501 | Gelled | Gelled | Gelled |
| 16 weeks | Gelled | Gelled | Gelled | Gelled |
| 20 weeks | Gelled | Gelled | Gelled | Gelled |

40° C. and 50° C. represent temperatures to which a packaged adhesive can be exposed while being stored in an uncooled warehouse or during transportation in the summer season. In addition, the adhesives are often exposed to those temperatures in heated pumping equipment that is often used to apply these adhesives in industrial settings, and premature thickening or gelling in that equipment can be a concern. Thus, storage stability at 40° C. and 50° C. can be very important as a practical matter. The 40° C. and 50° C. results are more discriminating than the 23° C. results. Under these storage conditions, Adhesive Example 6 is significantly more stable than any of the Comparative Adhesives. Adhesive Example 6 builds viscosity more slowly than do the other adhesives, and takes longer to gel at 40° C. and at 50° C. than do the others.

What is claimed is:
1. An epoxy-based structural adhesive, comprising: A) 25-60 wt % non-rubber-modified epoxy resin, based on weight of the adhesive; B) 5-45 wt % of one or more reactive elastomeric tougheners containing capped isocyanate groups, based on weight of the adhesive; and C) one or more epoxy curing agents; wherein at least 90% of the capped isocyanate groups of the reactive tougheners in the structural adhesive are capped with a ketoxime compound, wherein the one or more elastomeric tougheners comprises at least one of a ketoxime-capped reaction product of i) a polyol with an aliphatic polyisocyanate, or ii) a polyamine with a polyisocyanate; which, when the structural adhesive is cured, has an impact peel strength at room temperature greater than 39 N/mm.

2. The epoxy-based structural adhesive of claim 1, wherein at least 95% of the capped isocyanate groups of all reactive tougheners in the structural adhesive are capped with a ketoxime compound and 1% or fewer of the capped isocyanate groups are capped with an epoxy-functional capping group.

3. The epoxy-based structural adhesive of claim 1, wherein the reactive toughener(s) contain at least one segment of a polyether or a butadiene homopolymer or copolymer, the segment having a molecular weight of at least 800 daltons.

4. The epoxy-based structural adhesive of claim 1, wherein the epoxy resin includes at least one diglycidyl ether of a polyhydric phenol, the adhesive further comprises a liquid rubber-modified epoxy resin, a core-shell rubber or both a liquid rubber-modified epoxy resin and a core-shell rubber; and the adhesive contains from about 8 to 30 weight percent of the reactive toughener.

5. The epoxy-based structural adhesive of claim 1, which is a one-part adhesive that contains a curing agent and a catalyst, and which cures rapidly at a temperature of 140° C. or higher but slowly if at all at a temperature of 80° C. or lower.

6. The epoxy-based structural adhesive of claim 1, which further contains at least one monomeric or oligomeric, addition polymerizable, ethylenically unsaturated material having a molecular weight of less than about 1500.

7. The epoxy-based structural adhesive of claim 1, which contains at least one epoxide-terminated liquid rubber.

8. The structural adhesive of claim 1 which, when cured, has at least one of the following properties: a) a lap shear strength of at least about 15 MPa at 23° C.; b) a Young's modulus of at least about 1000 MPa at 23° C.; and c) a tensile strength of at least about 20 MPa at 23° C.

9. A method comprising providing a first substrate and a second substrate; applying the epoxy-based structural adhesive of claim 1 to one or both of the first and second substrates; contacting the first and second substrates so that the adhesive is located between the first and second substrates; and curing the structural adhesive to form an adhesive bond between the first and second substrates.

10. A cured composition prepared by curing the epoxy-based adhesive of claim 1.

11. The cured composition of claim 10, having a lap shear strength of at least about 15 MPa at 23° C.

12. The cured composition of claim 10, having a Young's modulus of at least about 1000 MPa at 23° C.

13. The cured composition of claim 10, having a tensile strength of at least about 20 MPa at 23° C.

* * * * *